United States Patent Office 3,158,005
Patented Nov. 24, 1964

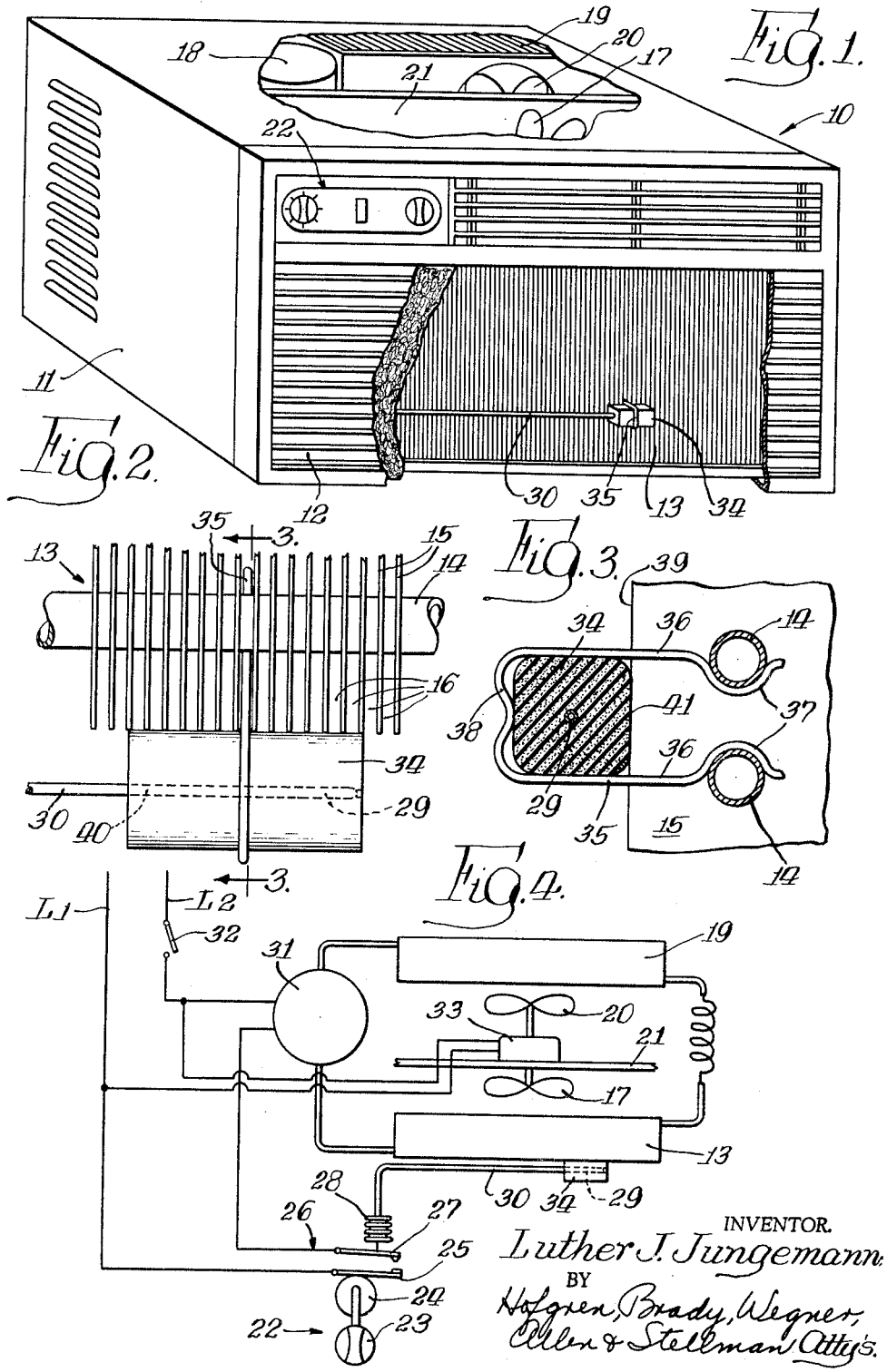

3,158,005
STRUCTURE FOR PROVIDING IMPROVED TEMPERATURE SENSING IN REFRIGERATION APPARATUS
Luther J. Jungemann, Evansville, Ind., assignor to Whirlpool Corporation, a corporation of Delaware
Filed June 19, 1962, Ser. No. 203,548
12 Claims. (Cl. 62—156)

This invention relates to air conditioning apparatus, and in particular, to control means for use in air conditioning apparatus.

In one form of conventional air conditioning apparatus an evaporator is provided with a plurality of air passages through which the room air is drawn in thermal transfer association with the evaporator for effective cooling thereof. The evaporator may be refrigerated by suitable conventional refrigerant delivery means including a compressor. The operation of the compressor is controlled normally by a thermostat arranged to initiate operation of the compressor when the temperature of the room air rises above a preselected high value and to discontinue operation of the compressor when the temperature of the room air falls below a preselected low value. The conventional thermostatic devices available for such control operate at approximately a 5 degree differential between the lower and upper operating temperature values. While it is possible to obtain such devices arranged for operation at smaller differentials, the cost thereof is relatively high, and, thus, while it is desirable to decrease the operating range of such air conditioners to below the normal 5 degree differential, this is not ordinarily done because of the high cost involved.

Another problem occurring in the conventional air conditioner is the problem of defrosting the evaporator whenever frost builds up thereon sufficiently to seriously affect the operation of the air conditioner. Toward this end, a second thermostatic device is ordinarily associated with the evaporator for sensing the icing condition and initiating, through suitable associated controls, a defrosting cycle. Here again, the use of a second thermostatic control presents a serious cost problem in the highly competitive appliance industry, and as a result, where the potential use of the air conditioner is one wherein frosting conditions will not ordinarily obtain, this second thermostatic control is omitted. As the manufacturer, however, has no absolute control over the use of the air conditioner, there are many instances where such air conditioners have been utilized where icing conditions actually do obtain, and, thus, serious malfunctioning of the air conditioners has resulted.

The present invention comprehends an improved air conditioner apparatus having thermostatic control means avoiding the above discussed problems in a novel and economical manner. Thus, a principal feature of the present invention is the provision of a new and improved air conditioning apparatus.

Another feature of the invention is the provision of such an apparatus having new and improved means for operating the apparatus within a small temperature range.

A further feature of the invention is the provision of such apparatus including means for utilizing a conventional relatively large temperature differential thermostat control for use in controlling the apparatus for selective operation within a substantially reduced temperature range.

Still another feature of the invention is the provision of such apparatus having new and improved means arranged for utilizing a single thermostatic control to provide the desired reduced temperature differential operation and the defrosting control desired in such air conditioning apparatus.

A yet further feature of the invention is the provision of a new and improved means for providing a controlled temperature at the temperature sensing portion of a thermostatic control device, including a block of resilient material having a preselected limited thermal conductivity, the block having a hollow opening through one portion thereof to receive and grip the sensing bulb.

Other features and advantages of the invention will be apparent from the following description taken in connection with the accompanying drawing wherein:

FIGURE 1 is an isometric front view of an air conditioning apparatus provided with means for controlling the operation of the apparatus embodying the invention, portions of the housing of the apparatus being broken away to facilitate illustration thereof;

FIGURE 2 is a fragmentary enlarged horizontal section thereof, illustrating the arrangement of the temperature indicating means in association with the fin and tube evaporator structure of the refrigeration apparatus;

FIGURE 3 is a transverse section thereof taken substantially along the line 3—3 of FIGURE 2; and FIGURE 4 is a schematic diagram illustrating the arrangement of the control means in the refrigeration apparatus.

In the exemplary embodiment of the invention as disclosed in the drawing, a conventional air conditioner generally designated 10 of the type adapted for use in a window installation, is shown to include an outer cabinet 11 having a front grill 12 behind which is spaced a conventional evaporator 13 having a plurality of refrigerant-conducting tubes 14 carrying a plurality of heat transfer fins 15 defining a plurality of air passages 16 through which room air may be circulated by means of a suitable fan 17. Fan 17 is disposed within cabinet 11 behind the evaporator 13. Also, carried within the cabinet 11 is a conventional compressor 18 for circulating refrigerant fluid to and from the evaporator 13, and a conventional condenser 19 through which cooling air is circulated by a second fan 20 disposed behind a transverse partition 21 within the cabinet. A manually adjustable control 22 is provided at the front of the cabinet for permitting the user of the refrigeration apparatus to select the temperature to which the room air is to be maintained by the apparatus.

More specifically, as shown in FIGURE 4, the control 22 includes a knob 23 selectively controlling a cam 24 which adjusts the position of a movable contact 25 of a thermostatic switch 26 having an operating contact 27 adjustably positioned by a bellows 28 actuated by a conventional liquid or vapor filled temperature sensing element 30 disposed directly in front of the evaporator 13 and connected to the bellows. As shown in FIGURE 4, switch 26 is connected in series with the motor 31 of the compressor 18, between suitable power supply leads $L_1$ and $L_2$, an on-off switch 32 being provided in lead $L_2$ for turning the refrigeration apparatus on and off. The fan motor 33 is connected in parallel with the series connected compressor motor 31 and switch 26 so that fans 17 and 20 are operated at all times when switch 32 is closed.

The refrigeration apparatus structure as discussed above is generally conventional. The present invention is concerned with the utilization of the single temperature sensing element 30 in a new and improved manner to provide improved control of the thermostat switch 26, as well as to utilize the thermostat switch 26 for controlling the defrosting of evaporator 13 whenever such defrosting is necessary. More specifically, the invention comprehends the provision of a block 34 formed of a resilient material, such as rubber, retained in engagement with fins 15 of evaporator 13 by a clip 35, and in which a portion 29, hereinafter referred to as sensing bulb 29, of the temperature sensing element 30 is disposed. The block is preferably composed of material having a preselected limited thermal conductivity. In one embodiment, a GRS type rubber compound was found to have the desired preselected limited thermal conductivity. In another embodiment, the desired heat transfer coefficient was obtained by using neoprene rubber with a proper amount of metallic powder, such as aluminum or zinc oxide, dispersed throughout the block. The clip 35, as best seen in FIGURE 3, may be provided with a pair of arms 36 having curved end portions 37 engaging the evaporator tube 14 to retain a bight portion 38 of the clip at a preselected distance from the front edge 39 of the fins 15. The spacing of the bight 38 is preferably slightly less than the normal uncompressed dimension of the block, and, thus, the clip 35 pulls the block firmly against the fin edges 39 and, in conjunction with the resiliency of the block, assures positive thermal transfer association of the block with the fins 15. An added advantage is gained in such an arrangement, in that the resiliency of the compressed block causes a force to be exerted upon the clip 35 whereby the end portions 37 are held in locked engagement with the tubes 14.

The sensing portion or bulb 29, as indicated above, is disposed within the block 34, the block being provided with a bore 40 which is slightly smaller in cross section than the sensing bulb, whereby the bulb is gripped by the block in firm thermal transfer contact therewith. In the illustrated embodiment, the bulb is spaced approximately one-half inch away from the fin edges 39 by means of the block.

In the operation of the improved control means, the block 34 serves firstly as a heat conducting means in thermal transfer association with the sensing bulb 29 and the room air being drawn into the evaporator air passages 16. Additionally, the block serves as a heat conducting means in thermal transfer association with the sensing bulb and with the evaporator. Thus, the temperature provided at the sensing bulb is a function of both the temperature of the room air to be cooled and the temperature of the evaporator. More specifically, the block 34 normally causes the temperature at the bulb 29 to be lower than the temperature of the room air when the compressor 18 is being operated to refrigerate the evaporator 13, and causes the temperature at the bulb 29 to be substantially the temperature of the room air when operation of the compressor 18 is discontinued as during a defrosting cycle. This functioning results from the fact that the evaporator is normally at a substantially lower temperature than the room air when refrigerant is being delivered thereto and quickly reaches the temperature of the room air when refrigerant delivery thereto is discontinued. As a result of this novel functioning of the block 34, the control of thermostat switch 26 is effected by a reduced temperature differential, as discussed above, and is operative to effect a defrosting of the evaporator when necessary.

More specifically, the operation of the control apparatus may be seen by considering the functioning thereof when the room air temperature is relatively high, such as 75° F., and the compressor is operating to cause the evaporator to have a temperature of approximately 45° F. Under these conditions, the average temperature along the upstream face of the evaporator is approximately 60° F. Thus, as the room air is being moved past the block 34 to the evaporator passages 16, the block has five of its sides subjected to a 75° F. temperature, and its rear side 41 subjected to a temperature of approximately 60° F. In the illustrated embodiment, the block dimensions and thermal conductivity are correlated so that the lower temperature effect at the rear surface 41 of the block causes the temperature at bulb 29 therein to be approximately 3 degrees lower than the 75° F. temperature to which the other portions of the block 34 are subjected. Thus, in this illustrative case, the sensing bulb would be at a temperature of approximately 72° F. Assuming that the thermostat switch 26 is a conventional switch having a 5 degree operation differential and is set by the control 22 for a cut-in temperature at 75° F., the cut-out temperature would be 70° F. Under these conditions when the room air temperature falls to 73° F., the temperature at the sensing bulb 29 (which is 3 degrees lower than the room air temperature) will be 70° F., and thus, the thermostat switch 26 will open to discontinue operation of the compressor. As the fan 17 continues to draw air through the evaporator, the average temperature at the upstream face of the evaporator rather quickly rises to the room air temperature of 73° F. and, thus, all portions of the block 34 are subjected to the 73° F. temperature. Thus, when the room air temperature rises to 75° F. no temperature-lowering control thereof is effected by the fin structure, and the sensing bulb temperature also is 75° F. so that the switch 26 is operated to cut-in the compressor again. Thus, it may be seen that the switch 26 is selectively opened and closed as a result of only a 2 degree room air temperature differential, while yet the switch itself is of the conventional construction requiring a 5 degree temperature differential to effect its operation.

As indicated briefly above, under certain operation conditions the evaporator may have frost form thereon tending to block the air passages 16. In the disclosed structure, the control is arranged to discontinue operation of the compressor upon such frost formation thereby to effect an automatic defrosting of the evaporator. Thus, as the frost builds up between the fins 15 in the air passages 16 directly behind the block 34, the average temperature along the upstream face of the evaporator drops substantially below its 60° F. temperature which in turn subjects that side of the block 34 adjacent the evaporator surface to a much colder temperature. At the same time, the frost tends to block the air passages 16, thereby decreasing the rate of air flow over the block. As a result of these two operational changes, the temperature at the sensing bulb 29 drops to the 70° F. cut-out temperature of the switch 26, thereby de-energizing the compressor. The compressor will remain de-energized until the temperature of the sensing bulb 29 becomes once again approximately 75° F., requiring substantially all frost to be removed from the evaporator, and thereby indicating an effective termination of the defrosting requirement.

In most air conditioning systems of the type described, it is desirable that compressor on cycles be a minimum of around six minutes to thereby permit more effective dehumidification. It is also desirable that compressor off cycles be a minimum of around two minutes to thereby allow the system to balance out and thus prevent the compressor from cycling on overload. These desired values of compressor on and off times can be attained by proper location of the sensing bulb 29 within block 34. More specifically, where a greater temperature difference between the temperature at the sensing bulb and the temperature of the room air is desired, the sensing bulb may be located more closely to the rear surface 41 of the block. Alternatively, the block 34 may be lengthened or may be provided with other shapes so as to expose less of the surface thereof to the room air and more surface to the fins. Where it is desired to have a smaller temperature difference between the temperature at the sensing bulb and the temperature of the room air, the spacing of the bulb from the fins may be increased, the length of the block decreased, or the shape of the block changed suitably to provide less contact with the fins. By controlling the conductivity of the block, the length of the on and off cycles may be controlled, an increase in the conductivity shortening these cycles and a decrease in the conductivity lengthening them. Lengthening the block may slightly increase the length of the off cycle time, and decrease the length of the on cycle time.

The specific location of the block 34 in front of the evaporator 13 may be varied. Thus, where the defrosting must be initiated prior to the complete covering of the evaporator, the block should be located at a portion of the evaporator which tends to frost over prior to the complete frosting over thereof. It has been found that improved operation results from the location of the spacer somewhere in the lower portion of the space in front of the evaporator, as the melt during the defrosting operation tends to run down along the fins and maintain the temperature of the rear surface 41 relatively low, thereby preventing a rise of temperature at bulb 29 to the cut-in temperature before substantially all of the frost has melted.

Thus, block 34 provides a highly desirable control of the temperature sensed by the bulb 29, whereby the single thermostat 26 is operated in a highly efficient and improved manner to provide small temperature differential control of the compressor operation and automatic defrost control in a simple and economical manner.

While I have shown and described one embodiment of my invention, it is to be understood that it is capable of many modifications. Changes, therefore, in the construction and arrangement may be made without departing from the spirit and scope of the invention as defined in the appended claims.

I claim:

1. In an air conditioner having an evaporator including fins defining an air passage, means for refrigerating the evaporator, and means for circulating air to be cooled through said air passage in heat transfer association with said fins, control means comprising: thermostat means for controlling said refrigerating means; and means for providing temperature indications to said thermostat means including a temperature sensing bulb, a block of resilient material having a preselected limited thermal conductivity, said bulb being substantially enveloped by said block in thermal transfer engagement therewith, and a clip urging said block resiliently into intimate thermal transfer engagement with said fins.

2. In an air conditioner having apparatus arranged to be refrigerated including an evaporator defining an air passage, means for refrigerating the apparatus, means for circulating air to be cooled through said air passage in heat transfer association with said evaporator, and control means for selectively operating said refrigerating means, means for operating the control means comprising: means responsive to a preselected high temperature indication to operate the control means to operate the refrigerating means and responsive to a preselected low temperature indication to operate the control means to discontinue operation of the refrigerating means; and means for providing temperature indications to said temperature responsive means including a temperature sensing means disposed upstream of the evaporator, and heat conducting means disposed in the path of the air circulated by said circulating means before the air is delivered to said evaporator, said heat conducting means enveloping said sensing means and including a first portion in thermal transfer association with said sensing means and the air to be cooled, and a second portion in thermal transfer association with said sensing means and said apparatus, said first and second portions cooperatively providing a temperature at said sensing means lower than the temperature of the air to be cooled when the refrigerating means is being operated and substantially the temperature of the air shortly after operation of the refrigerating means is discontinued.

3. The air conditioning device of claim 2 wherein said heat conducting means comprises a block of resilient material having limited thermal conductivity.

4. The air conditioning apparatus of claim 2 wherein said sensing means includes a bulb and said heat conducting means comprises a block of resilient material having a preselected limited thermal conductivity, said block having a hollow opening through one portion thereof to receive and grip the sensing bulb.

5. In an air conditioner having an evaporator defining an air passage, means for refrigerating the evaporator, means for circulating air to be cooled through said air passage in heat transfer association with said evaporator, and control means for selectively operating said refrigerating means, means for operating the control means comprising: means responsive to a preselected high temperature indication to operate the control means to operate the refrigerating means and responsive to a preselected low temperature indication to operate the control means to discontinue operation of the refrigerating means; and means for providing temperature indications to said temperature responsive means including a temperature sensing means, and a heat conducting member substantially enveloping said sensing means and being disposed in thermal transfer association with said sensing means and the air to be cooled and in thermal transfer association with said sensing means and the evaporator, said heat conducting member providing a temperature at said sensing means lower than the temperature of the air to be cooled when the refrigerating means is being operated and substantially the temperature of the air shortly after operation of the refrigerating means is discontinued.

6. The air conditioner structure of claim 5 wherein said heat conducting member comprises a block of resilient material having limited thermal conductivity.

7. The air conditioning device of claim 5 wherein said sensing means is disposed in the air passage upstream of said evaporator.

8. In an air conditioner having a fin and tube evaporator defining an air passage between a pair of fins thereof, means for refrigerating the evaporator, means for circulating air to be cooled through said air passage in heat transfer association with said fins, and control means for selectively operating said refrigerating means, means for operating the control means comprising: means responsive to a preselected high temperature indication to operate the control means to operate the refrigerating means and responsive to a preselected low temperature indication to operate the control means to discontinue operation of the refrigerating means; and means for providing temperature indications to said temperature responsive means including a temperature sensing means disposed in the air passage upstream of said evaporator, a block of resilient material having limited thermal conductivity, said sensing means being imbedded in said block, said block defining a first heat conducting portion in thermal transfer contact with said sensing means and the air to be cooled and a second heat conducting portion in thermal transfer contact with said sensing means and said fins, said first and second heat conducting portions cooperatively providing a temperature at said sensing means lower than the temperature of the air to be cooled when the refrigerating means is being operated and substantially the temperature of the air shortly after operation of the refrigerating means is discontinued.

9. In an air conditioning device having a heat exchanger defining an air passage, means for circulating a fluid through said heat exchanger, and means for circulating air to be conditioned through said air passage in heat transfer association with said heat exchanger, control means comprising: thermostat means for controlling the circulation of fluid through said heat exchanger; and means for providing temperature indications to said thermostat means including a temperature sensing means, a body of material having a preselected limited thermal conductivity substantially enveloping said sensing means, and means for attaching said body in thermal transfer relationship with said heat exchanger.

10. The air conditioning device of claim 9 wherein said body of material comprises a block of resilient material having a preselected limited thermal conductivity.

11. The air conditioning device of claim 10 wherein said sensing means is disposed in the air passage upstream of said heat exchanger.

12. In an air conditioning device having a heat exchanger defining an air passage, means for circulating a refrigerating fluid through said heat exchanger, and means for circulating air to be refrigerated through said air passage in heat transfer association with said heat exchanger, control means comprising: thermostat means for controlling the circulation of fluid through said heat exchanger; and means for providing temperature indications to said thermostat means including a temperature sensing means, and means in thermal transfer association with said temperature sensing means for transferring heat energy between air in said air passage and said sensing means, and between said heat exchanger and said sensing means, said last named means being constructed to cause the temperature in the sensing element to be lower than the temperature of said air when refrigerating fluid is being circulated through the heat exchanger and to be substantially the temperature of said air when circulation of the refrigerating fluid is terminated.

References Cited in the file of this patent
UNITED STATES PATENTS

| 2,117,104 | Rorison | May 10, 1938 |
| 2,947,153 | Atchison | Aug. 2, 1960 |